(12) United States Patent
Jia et al.

(10) Patent No.: US 12,394,030 B2
(45) Date of Patent: Aug. 19, 2025

(54) GAZE-AWARE TONE MAPPING AND CHROMATIC ADAPTATION

(71) Applicant: Meta Platforms Technologies, LLC, Menlo Park, CA (US)

(72) Inventors: Zhang Jia, San Jose, CA (US); Serhan Isikman, Redwood City, CA (US); Minchen Wei, Kowloon (HK)

( * ) Notice: Subject to any disclaimer, the term of this patent is extended or adjusted under 35 U.S.C. 154(b) by 467 days.

(21) Appl. No.: 17/868,487

(22) Filed: Jul. 19, 2022

(65) Prior Publication Data

US 2024/0029218 A1    Jan. 25, 2024

(51) Int. Cl.
*G06K 9/00* (2022.01)
*G06T 5/80* (2024.01)
*G06T 5/92* (2024.01)

(52) U.S. Cl.
CPC ............. *G06T 5/92* (2024.01); *G06T 5/80* (2024.01); *G06T 2207/20104* (2013.01)

(58) Field of Classification Search
None
See application file for complete search history.

(56) References Cited

U.S. PATENT DOCUMENTS

| | | | |
|---|---|---|---|
| 9,897,809 B2 | 2/2018 | Hue et al. | |
| 9,940,901 B2 | 4/2018 | Luebke et al. | |
| 10,120,194 B2 | 11/2018 | Cobb et al. | |
| 10,621,708 B2 | 4/2020 | Malaika et al. | |
| 10,915,148 B1 | 2/2021 | Richards et al. | |
| 11,211,030 B2 | 12/2021 | Bonnier et al. | |
| 2014/0252056 A1 | 9/2014 | Murray et al. | |
| 2015/0123991 A1 | 5/2015 | Yarosh et al. | |
| 2015/0325035 A1 | 11/2015 | Howell | |
| 2020/0233681 A1 | 7/2020 | Garstenauer et al. | |
| 2020/0265797 A1* | 8/2020 | Croxford | G09G 3/2092 |
| 2021/0096726 A1 | 4/2021 | Faulkner et al. | |
| 2021/0099632 A1 | 4/2021 | Molholm | |
| 2021/0233318 A1* | 7/2021 | Stolzenberg | A63F 13/56 |
| 2022/0091723 A1 | 3/2022 | Faulkner et al. | |
| 2023/0114043 A1 | 4/2023 | Wan et al. | |
| 2023/0196657 A1 | 6/2023 | Ichiba | |
| 2023/0199420 A1 | 6/2023 | Dorn et al. | |

OTHER PUBLICATIONS

Choi H-H., et al., "Tone Mapping of High Dynamic Range Images Combining Co-Occurrence Histogram and Visual Salience Detection," Applied Science, vol. 9, Issue 21, 2019, 20 pages.

(Continued)

*Primary Examiner* — Wei Wen Yang
(74) *Attorney, Agent, or Firm* — Greenberg Traurig, LLP

(57) ABSTRACT

According to examples, a system may use gaze direction information to perform tone mapping or chromatic adaptation for virtual reality (VR) environments. The system may include a processor and a memory storing instructions. When the processor executes the instructions, the system may determine a user focus location within a physical environment. An image corresponding to the physical environment may be received. The system may determine a visual property of the physical environment corresponding to the user focus location. The system may modify a color mapping of a region of the image based on the determined visual property to generate an output image.

20 Claims, 9 Drawing Sheets

(56) References Cited

OTHER PUBLICATIONS

Mantiuk R., et al., "Gaze-Dependent Tone Mapping," International Conference Image Analysis and Recognition, May 2013, pp. 426-433.

European Search Report for European Patent Application No. 24157806.1, dated Jul. 11, 2024, 4 pages.

Jiddi S., et al., "Detecting Specular Reflections and Cast Shadows to Estimate Reflectance and Illumination of Dynamic Indoor Scenes," IEEE Transactions on Visualization and Computer Graphics, Feb. 28, 2020, vol. 28, No. 2, pp. 1249-1260.

* cited by examiner

GAZE-AWARE TONE MAPPING AND CHROMATIC ADAPTATION

TECHNICAL FIELD

This patent application relates generally to display image rendering techniques, and more specifically, to systems and methods using gaze-aware tone mapping and chromatic adaptation.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to form a first image and a second image, and with these images, to generate "binocular" vision for viewing by a user. A head-mounted display (HMD) device may offer a wider field of view (FOV) than other displays. Due to optical design and hardware limitations, however, achieving uniform color across the field of view can be difficult. For example, some display hardware may exhibit color changes when viewed from different viewing angles. Optical layers and/or lenses between the display hardware and the user's eye may also exhibit color changes when viewed from different viewing angles.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
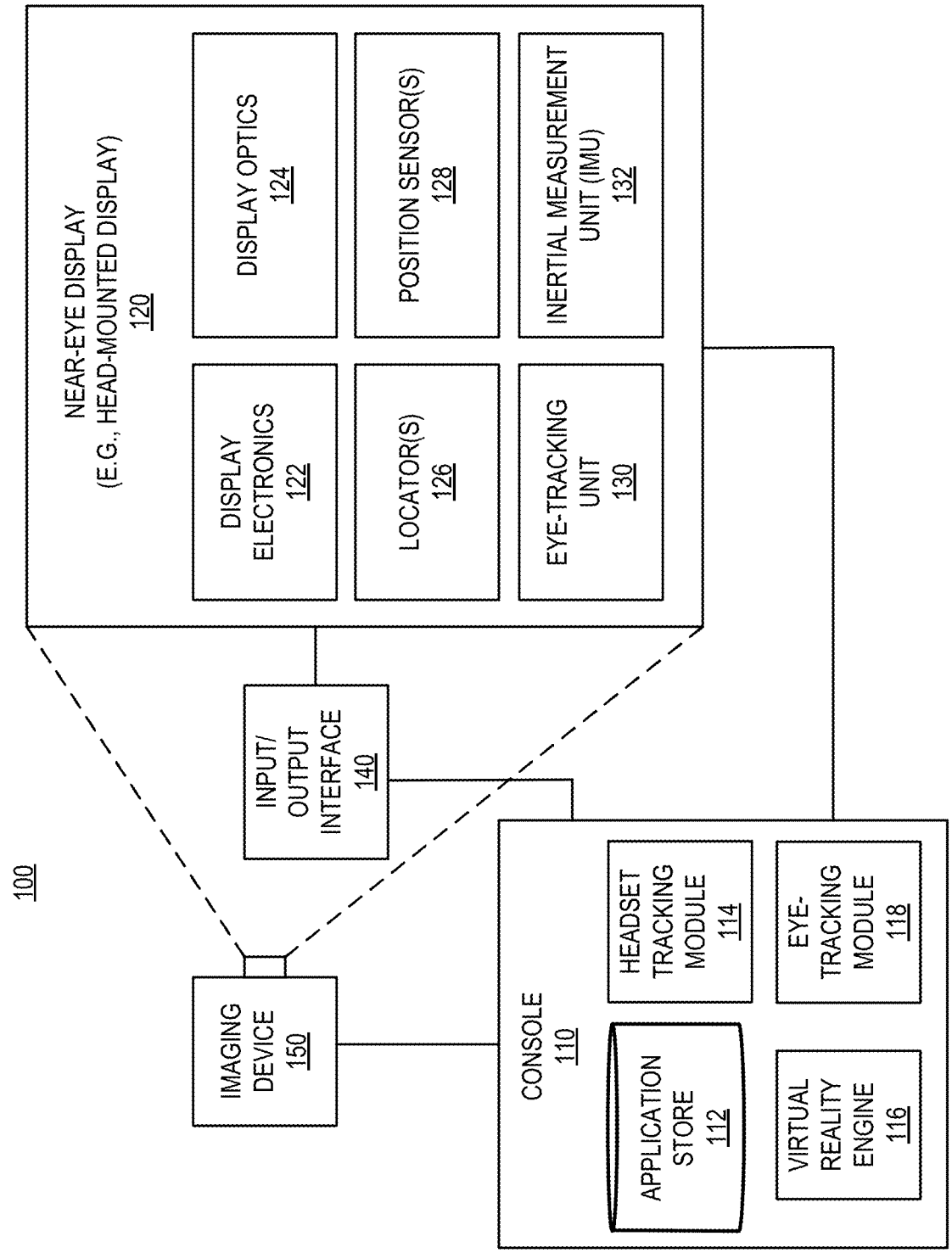
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Virtual reality (VR) and augmented reality (AR) displays may offer a significantly wider field of view (FOV) than traditional displays, creating an immersive experience for a user. However, due to optical design and hardware limitations, it may be difficult to achieve uniform color across the field of view. For example, display hardware, such as organic light emitting diodes (OLEDs), may exhibit changes in perceived color when viewed from different viewing angles. Optical layers and/or lenses between the display and the human eye may also contribute to color distortion. As another example, viewing optics in virtual reality (VR) systems (e.g., pancake optics) may exhibit ghosting and veiling glare issues due to complex optical layers and coatings.

In some examples of the present disclosure, information relating to gaze direction may be used, e.g., with other information, to perform color correction in a virtual reality (VR), augmented reality (AR), or mixed reality (MR) environment. For example, a region in a field of view of a displayed virtual reality (VR) environment may be characterized by bright content. In some examples, the brightness of the region may be modified, e.g., adjusted downward, based on a user focus location toward which the user's gaze is directed. The brightness of the region may be modified based on the optical design of the head-mounted display (HMD) device. As another example, the user focus location may be used as a reference for chromatic adaptation of the region, e.g., adjusting a white point of the region so that the color appearance of the region is representative of the color appearance of a corresponding physical environment.

According to examples, a system may use gaze direction information to perform tone mapping or chromatic adaptation for virtual reality (VR) environments. The system may include a processor and a memory storing instructions. When the processor executes the instructions, the system may determine a user focus location within a physical environment. An image corresponding to the physical environment may be received. The system may determine a visual property of the physical environment corresponding to the user focus location. The system may modify a color mapping of a region of the image based on the determined visual property to generate an output image.

Brightness and color uniformity are design considerations in optical design. During optical design processes, certain design considerations are balanced, including, for example, brightness uniformity, color uniformity, sharpness, field of view (FOV), resolution, distortion stability, virtual image distance, and the like. Using information regarding gaze direction to adjust brightness and/or color uniformity dynamically may allow some design considerations to be relaxed. Performance may be improved in some aspects, such as higher resolution or a wider field of view (FOV).

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including an HMD, a pair of glasses, or other similar wearable eyewear or device. Examples of the near-eye display 120 are further described below with respect to FIGS. 2 and 3. Additionally, in some examples, the functionality described herein may be used in an HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
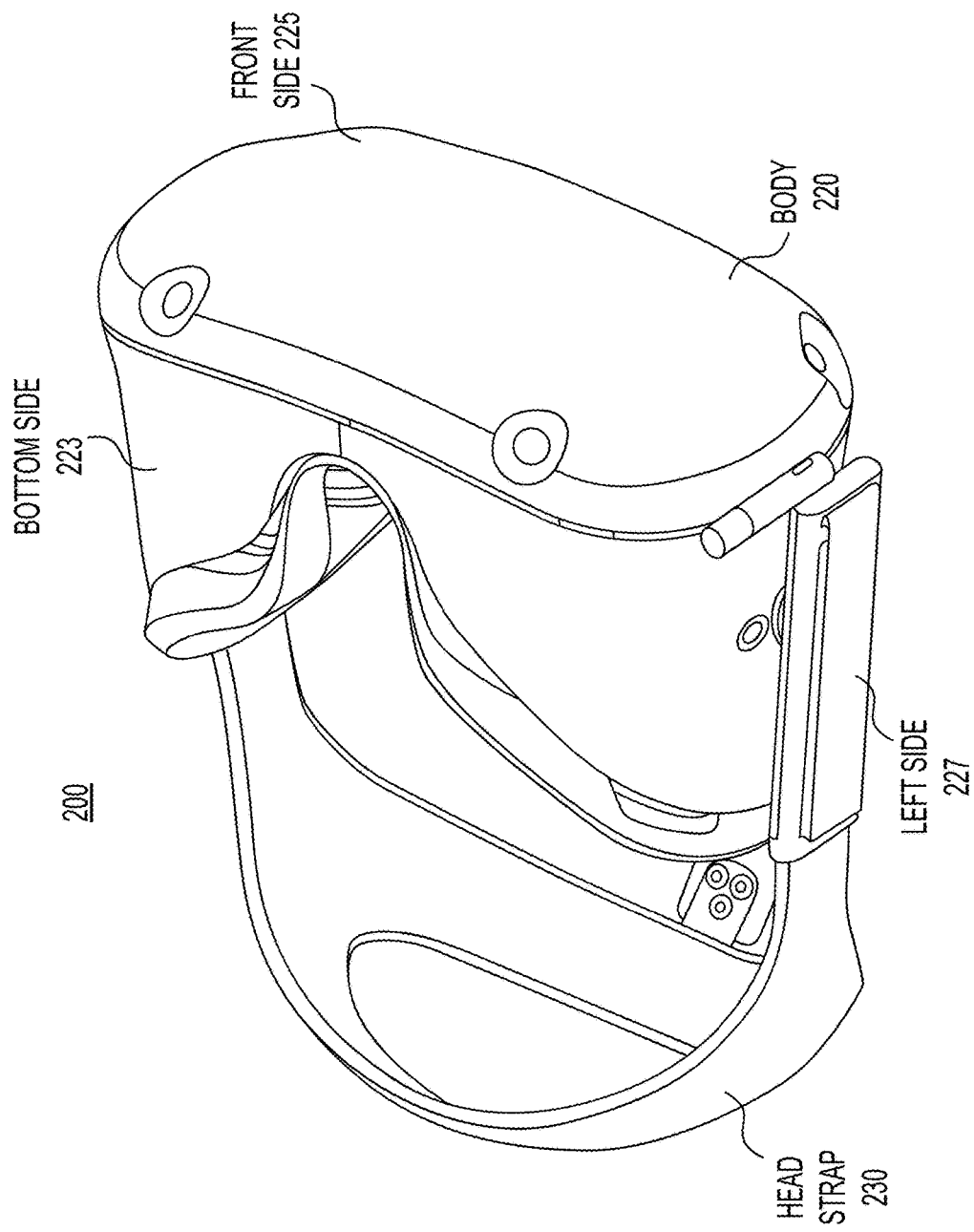
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. For example, the length of the head strap 230 may be adjustable to accommodate a range of user head sizes. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
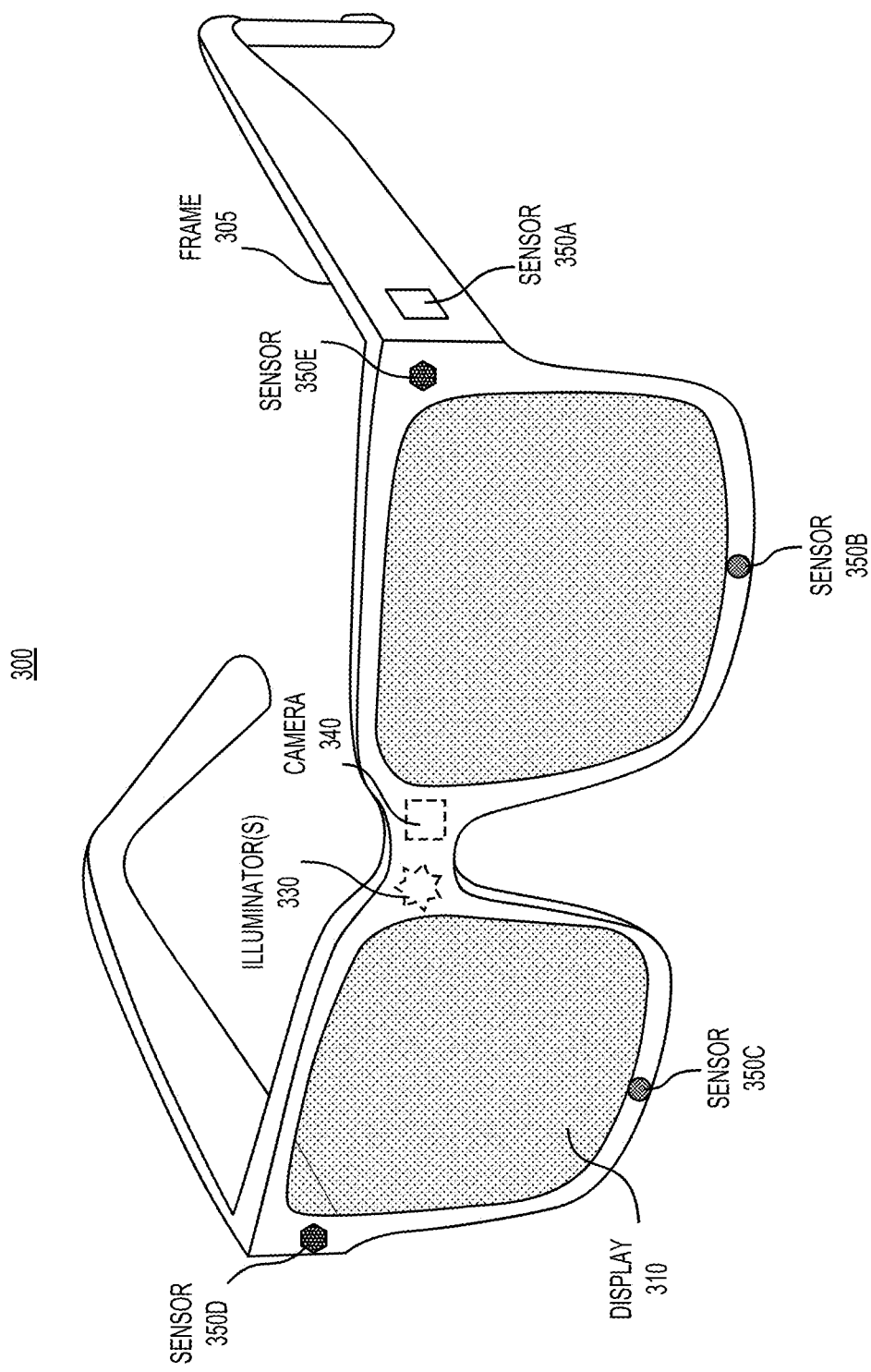
FIG. 3 illustrates a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific example of near-eye display 120 of FIG. 1, and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1)

to add virtual objects to the captured images or modify physical objects in the captured images, and the processed images may be displayed to the user by the display 310 for augmented reality (AR) and/or mixed reality (MR) applications.

Figure 4:
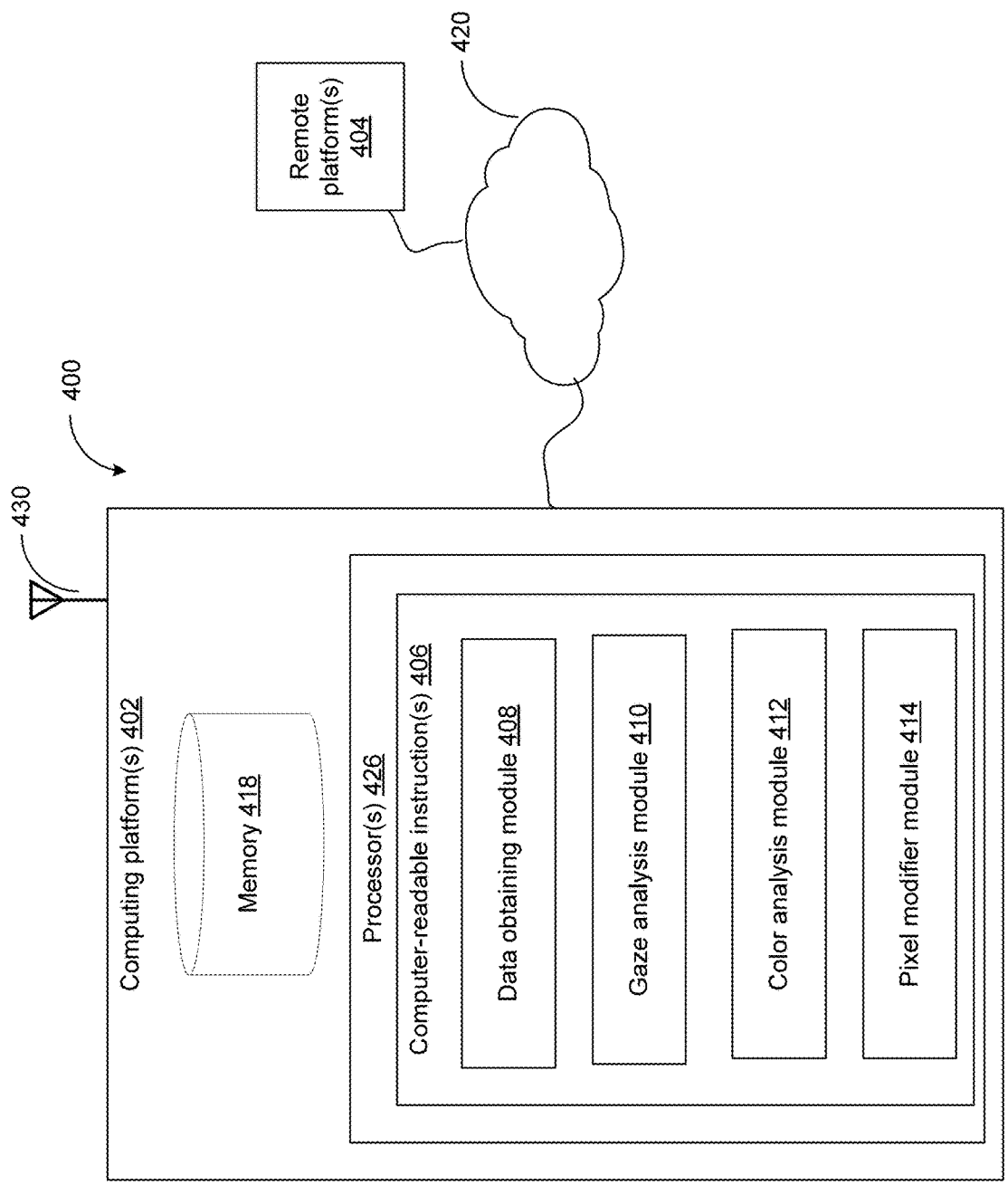
FIG. 4 illustrates a block diagram of a color correction system, according to an example.

FIG. 4 illustrates a block diagram of a color correction system 400 configured to use gaze direction information to perform tone mapping or chromatic adaptation for virtual reality (VR) environments, in accordance with various examples. The color correction system 400 may include one or more computing platforms 402. The one or more computing platforms 402 may be communicatively coupled with one or more remote platforms 404. In some examples, users may access the color correction system 400 via the remote platforms 404.

In some examples, the one or more computing platforms 402 may be configured by computer-readable instructions 406. Computer-readable instructions 406 may include modules. The modules may be implemented as one or more of functional logic, hardware logic, electronic software modules, and the like. The modules may include one or more of a data obtaining module 408, a gaze analysis module 410, a color analysis module 412, and a pixel modifier module 414.

In some examples, the data obtaining module 408 may receive an image corresponding to a physical environment, e.g., in which the color correction system 400 is located. For example, the color correction system 400 may be embodied in a head-mounted display (HMD) device. The head-mounted display (HMD) device may include one or more camera(s) or image sensor(s) that capture images representing the physical environment. The images may be still images. The images may be frames extracted from a video feed. The head-mounted display (HMD) device may include a display (e.g., a screen) that displays the images or modified images.

In some examples, the gaze analysis module 410 may determine a user focus location within the physical environment on which the user's attention is focused. The color correction system 400 may use gaze direction as a proxy for the user's attention, e.g., the color correction system 400 may determine that the user's attention is focused on a location at which the user's gaze is directed. In some examples, the color correction system 400 may determine the user focus location based at least in part on other proxies for the user's attention, such as a location of a hand gesture or a location of a pointing device. As another example, the color correction system 400 may determine the user focus location based at least in part on the location of an object that is present in the physical environment. For example, if a prominent object is in the physical environment, the color correction system 400 may determine that tone mapping should be centered on that object, even if the user may not be looking at the object. In some examples, the gaze analysis module 410 determines a gaze direction of the user. For example, the gaze analysis module 410 may receive image data from user-facing cameras or image sensors. The image data may represent an image or images that include pixels representing the user's pupils. Based on the position of the user's pupils, the gaze analysis module 410 may determine the direction of the user's gaze. In some examples, the user's eyes may be illuminated, for example, by LASER or near infrared (nIR) illumination sources, such as light emitting diodes (LEDs). The image represented by the image data may include pixels representing reflections from the user's eyes (e.g., glints) that may be used to determine the direction of the user's gaze.

In some examples, the color analysis module 412 determines a visual property of the physical environment corresponding to the user focus location. For example, the color analysis module 412 may receive image data representing the physical environment from a world-facing camera or image sensor. The color analysis module 412 may analyze color values associated with one or more pixels in the image data to determine a color value associated with the user focus location in the physical environment to which the user's gaze is directed. The brightness of the user focus location may be determined.

In some examples, the color analysis module 412 may select a size of the user focus location. For example, the color analysis module 412 may select a size of the area that is to serve as a basis for tone mapping and/or chromatic adaptation. In some examples, the color analysis module 412 may apply an averaging or filtering function to the image data representing the physical environment. For example, the color analysis module 412 may apply a filtering function to account for noise and/or natural micro saccade from the eye tracker. In some examples, the color analysis module 412 may differentiate between different eye movements such as saccade, micro saccade, slow pursuit, and/or vestibulo ocular reflex (VOR). The color analysis module 412 may apply different filtering functions to account for each type of eye movement. For example, the color analysis module 412 may apply little or no averaging to the image data in the case of saccade so that changes may be applied more quickly.

In some examples, the pixel modifier module 414 modifies a color mapping of a region of the image corresponding to the physical environment based on the determined visual property to generate an output image. For example, the pixel modifier module 414 may use the color values from the area around the user focus location to perform color correction on a region of the image.

Figure 5:
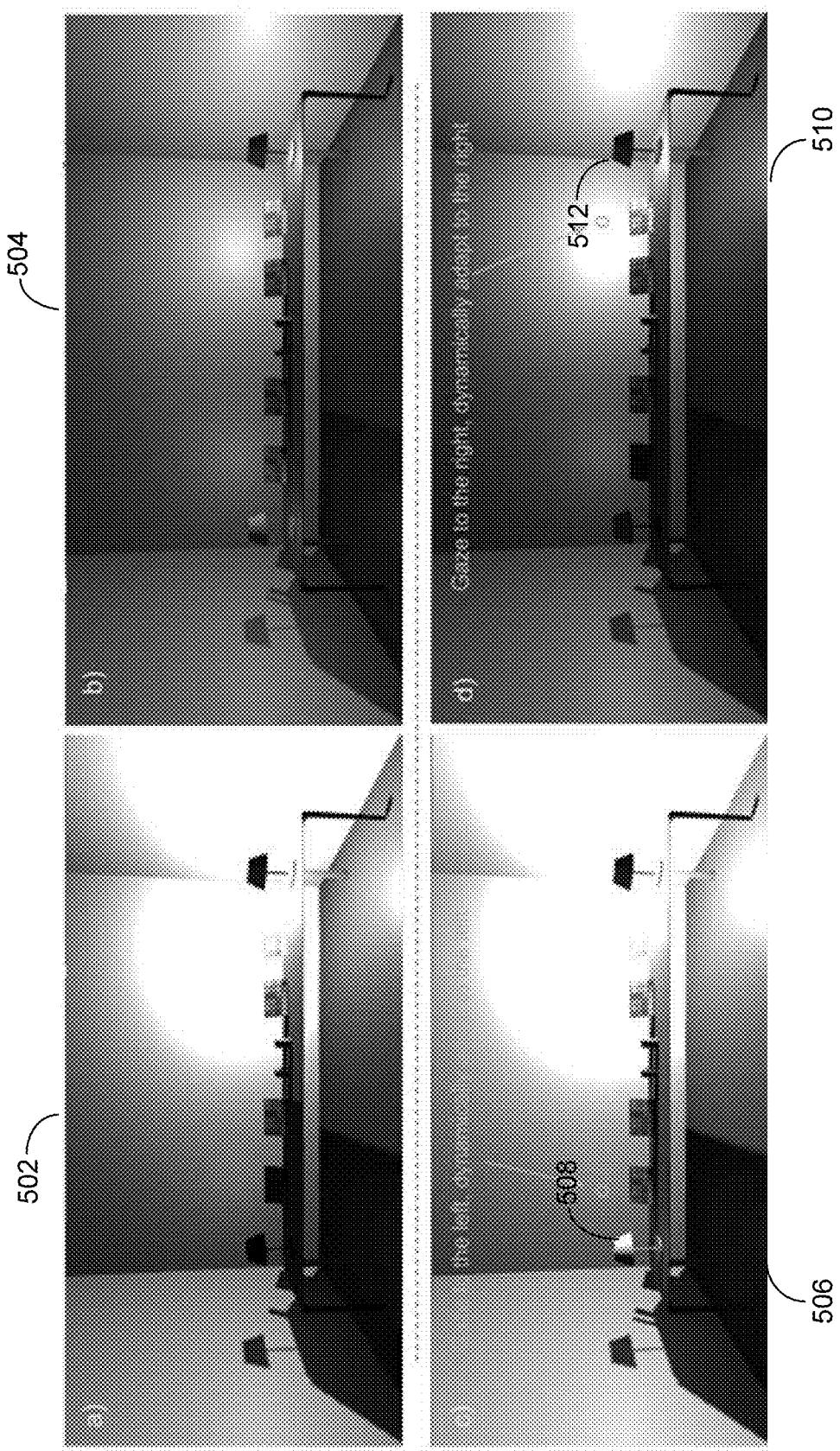
FIG. 5 is a diagram illustrating tone mapping including brightness adjustment, according to an example.

In some examples, modifying the color mapping may include modifying a tone mapping of the region of the image. For example, the pixel modifier module 414 may perform dynamic brightness adjustment. FIG. 5 is a diagram illustrating tone mapping including brightness adjustment, according to an example. As illustrated in FIG. 5, an image 502 represents a real world scene including a wide range of brightness values. An image 504 represents an example virtual reality (VR) representation of the real world scene illustrated in image 502. It will be appreciated that, in image 504, the dynamic range of the image is reduced relative to the image 502. For example, the bright area on the right side of image 504 appears significantly dimmer than the corresponding area in image 502. Some displays for high dynamic range (HDR) images are capable of high absolute brightness (e.g., nits). In some examples, dynamic brightness adjustment may be performed without the need for a display with high absolute brightness capabilities.

For example, as represented in an image 506, the gaze analysis module 410 may determine that the user's gaze is directed to a user focus location 508. The pixel modifier module 414 may modify the tone mapping of image 506 based on an area around the user focus location 508. Because the area around the user focus location 508 is relatively dark, the pixel modifier module 414 may modify the tone mapping of image 506 to increase the brightness of image 506.

As another example, as represented in an image 510, the gaze analysis module 410 may determine that the user's gaze is directed to a user focus location 512. The pixel modifier module 414 may modify the tone mapping of image 510 based on an area around the user focus location

512. Because the area around the user focus location 512 is relatively bright, the pixel modifier module 414 may modify the tone mapping of image 510 to decrease the brightness of image 510.

In some examples, due to optical design and hardware limitations, it may be difficult to achieve uniform color across the field of view (FOV). Display hardware (e.g., organic light emitting diodes (OLEDs)) may exhibit color changes when viewed from different viewing angles. In some examples, brightness correction may be implemented as part of color correction. Brightness correction may be achieved by emission duty or persistence adjustment and/or backlight spatial adjustment. For example, within each frame (e.g., 90 frames per second (fps) for virtual reality), the display or backlight may not be constantly on. The display or backlight may have a duty cycle of, for example, 10% (e.g., 1 ms), 20%, or 30%. In some examples, backlight spatial adjustment may be achieved by spatially varying the brightness across the surface of the display. This may be achieved in a backlight with arrayed LEDs. Brightness correction may be spatially slow, e.g., there may be few or no sharp corrections. In some examples, brightness correction may be performed every 10° across the field of view (FOV) with a smooth transition, such as a B spline surface, e.g., the surface 810 of FIG. 8.

Figure 6:
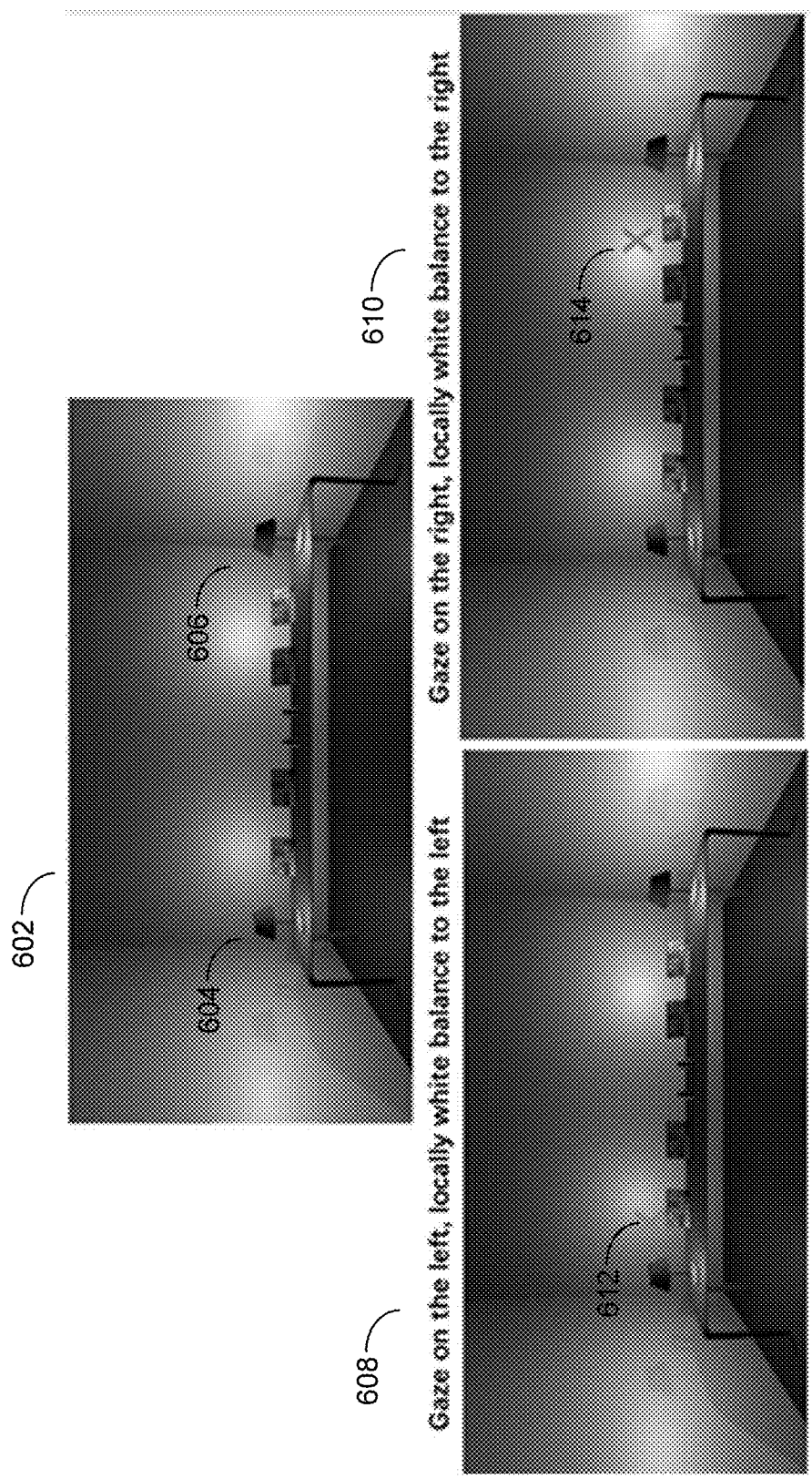
FIG. 6 is a diagram illustrating chromatic adaptation including local white balancing.

In some examples, modifying the color mapping may include performing chromatic adaptation of the region of the image. For example, the pixel modifier module 414 may perform local white balancing (e.g., adjust a white point) based on an area around the user focus location. FIG. 6 is a diagram illustrating chromatic adaptation including local white balancing, according to an example.

As illustrated in FIG. 6, an image 602 represents a real world scene including two light sources 604, 606. The light source 604 may have a color temperature of, e.g., 2700 K. The light source 606 may have a color temperature of, e.g., 6500 K. Image 602 may exhibit global white balancing. In some examples, white balancing may be performed by using the color temperature of an area of maximum brightness in the scene as a reference. This may lead to unsatisfactory results. Images 608, 610 may represent the scene illustrated in image 602 with local white balancing. For example, the white point of the area near the user focus location may be adjusted according to the color value of a corresponding location in the physical environment and/or adaptation of the human eye. For example, if the user gazes at the light source 604, local white balancing may be performed using the color value of the light source 604 as the white point, as shown in image 608. On the other hand, if the user gazes at the light source 606, local white balancing may instead be performed using the color value of the light source 606 as the white point, as shown in image 610. This may result in different colors rendered in images 608, 610, even though the images may represent the same physical scene. In some examples, the white point of the area near the user focus location may be adjusted to satisfy a creative need of the content creator.

For example, as represented in an image 608, the gaze analysis module 410 may determine that the user's gaze is directed to a user focus location 612. The pixel modifier module 414 may adjust the white point of image 608 based on an area around the user focus location 612. Because the area around the user focus location 612 has a color temperature of approximately 2700 K, the white balance of image 608 may be adjusted to a white point with a lower color temperature.

As another example, as represented in an image 610, the gaze analysis module 410 may determine that the user's gaze is directed to a user focus location 614. The pixel modifier module 414 may adjust the white point of image 610 based on an area around the user focus location 614. Because the area around the user focus location 614 has a color temperature of approximately 6500 K, the white balance of image 608 may be adjusted to a white point with a higher color temperature.

Figure 7:
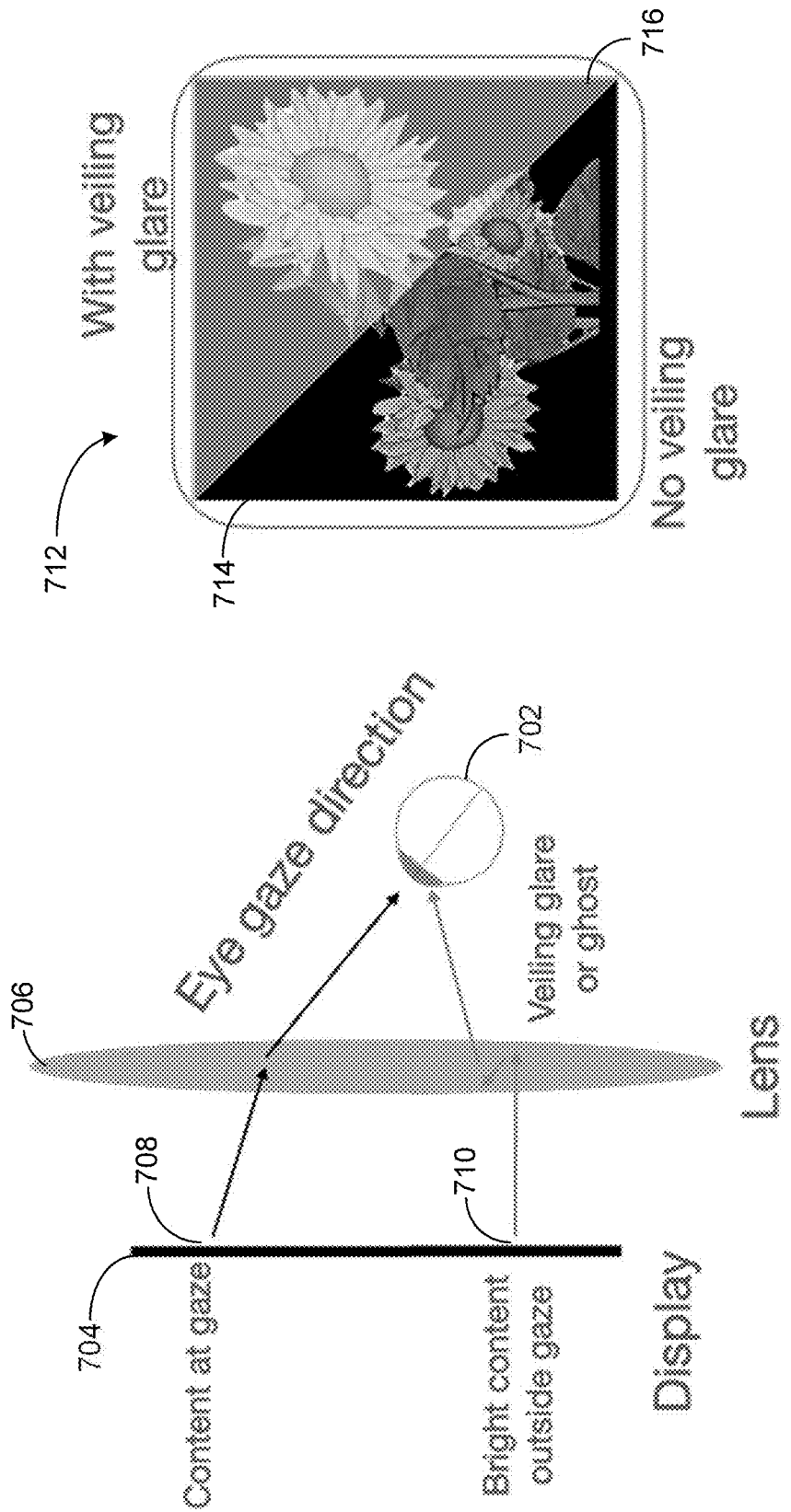
FIG. 7 illustrates a diagram of an example of veiling glare.

In some examples, modifying the color mapping may include performing chromatic adaptation of the region of the image to counteract the effect of a phenomenon known as veiling glare. Veiling glare is an imperfection of performance in optical instruments, such as lenses, that arises from incoming light that strays from normal image-forming paths and reaches the focal plane. As a result, noise may be superimposed on the image sensed by a sensor or perceived by an eye, and the image may be degraded by loss of contrast and reduced definition. FIG. 7 illustrates a diagram of an example of veiling glare. As illustrated in FIG. 7, an eye 702 perceiving content on a display 704 through a lens 706 may perceive the content at a user focus location 708. High brightness content at another location 710 may result in the veiling glare phenomenon. An example image 712 includes a portion 714 without the veiling glare effect and a portion 716 with the veiling glare effect. In some examples, the pixel modifier module 414 may adjust the color values of at least part of the image to counteract the veiling glare effect based on the user focus location. For example, the veiling glare effect may be generated by a bright signal from a peripheral direction, as shown at the left side of FIG. 7. If it is known that the user is not looking directly at the bright signal, the color values of the part of the image corresponding to the bright signal may be adjusted to dim the bright signal. This may reduce the veiling glare effect.

In some examples, due to optical design and hardware limitations, it may be difficult to achieve uniform color across the field of view (FOV). Display hardware (e.g., organic light emitting diodes (OLEDs)) may exhibit color changes when viewed from different viewing angles. Color correction may be applied on a per frame basis across the display area, based on the user focus location (e.g., gaze direction). In some examples, the color correction may be spatially slow, e.g., there may be few or no sharp corrections. In some examples, color correction may be performed every 10° across the field of view (FOV) with a smooth transition, such as a B spline surface, e.g., the surface 810 of FIG. 8.

Figure 8:
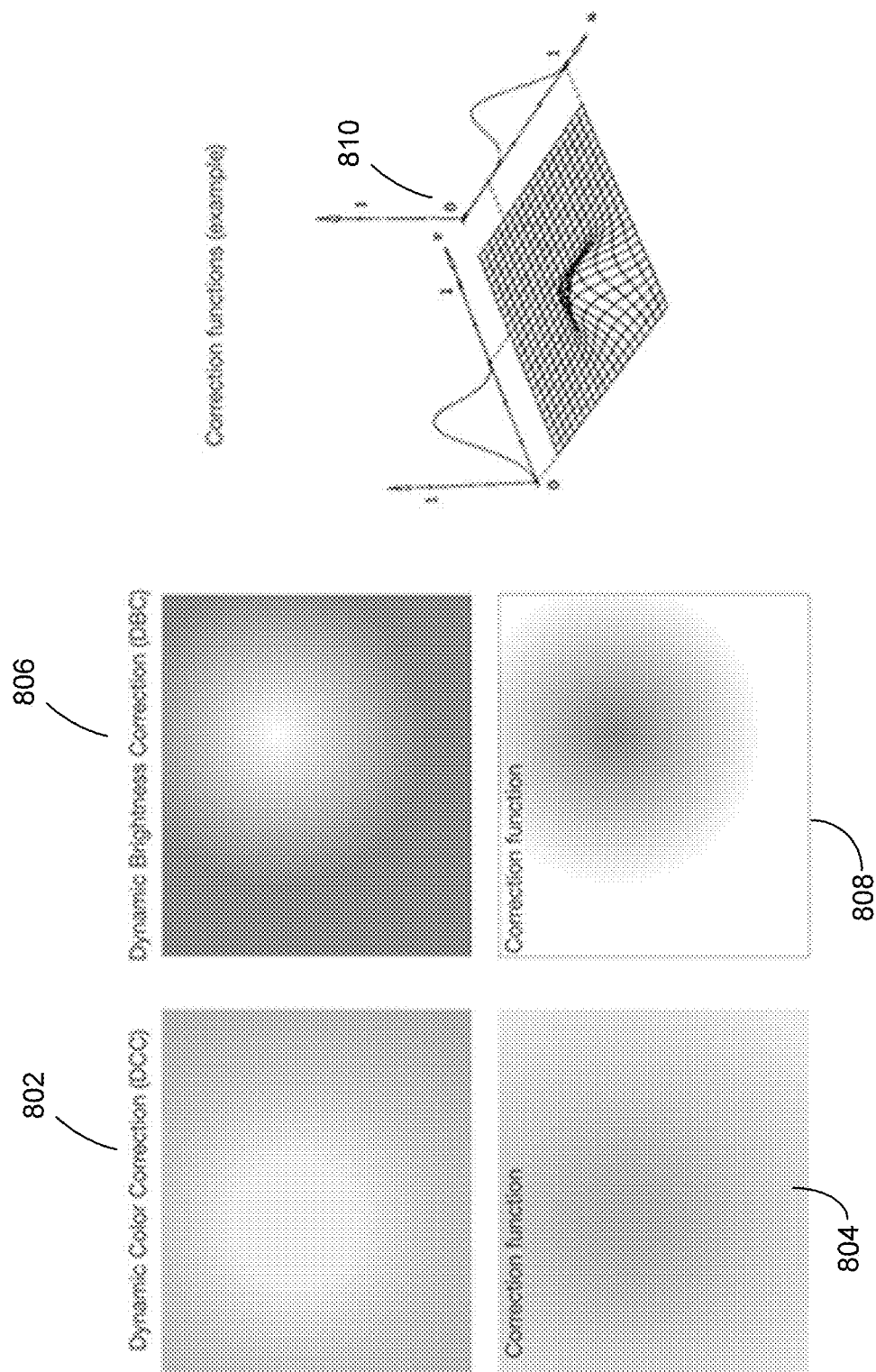
FIG. 8 illustrates a diagram showing examples of dynamic color correction (DCC) and dynamic brightness correction (DBC), according to some examples.

In some examples, the pixel modifier module 414 may use user focus location (e.g., gaze direction) information to perform dynamic color correction (DCC) and dynamic brightness correction (DBC) on an image. FIG. 8 illustrates a diagram showing examples of dynamic color correction (DCC) and dynamic brightness correction (DBC). An image 802 may represent an input image to which dynamic color correction (DCC) may be applied. A color correction function may be represented by an image 804. An image 806 may represent an input image to which dynamic brightness correction (DBC) may be applied. A brightness correction function may be represented by an image 808. A surface 810 may represent example correction functions.

In some examples, distortion (e.g., pupil swim) may be introduced instability or exacerbated to achieve other benefits, such as higher resolution or more accurate color in the center field of view (FOV). The pixel modifier module 414 may compensate for distortion instability associated with changes in user focus location (e.g., gaze direction) by dynamic distortion correction (DDC). In some examples, dynamic distortion correction (DDC) focuses on peripheral minor adjustments with a large spatial size. A large spatial size may correspond to a slow spatial frequency. If the correction is characterized by a Gaussian shape, the correction may have a wide shape, e.g., there may no high frequency corrections. A base distortion may be present, e.g., to present a barrel-shaped display pattern to achieve a regular angular space through the lens. Dynamic color correction (DCC), dynamic brightness correction (DBC), and/or dynamic distortion correction (DDC) may be applied on top of this base distortion correction.

Dynamic color correction (DCC), dynamic brightness correction (DBC), and/or dynamic distortion correction (DDC) may be performed by software, by a display driver integrated circuit (DDIC), and/or by a system on a chip (SOC), which may include a central processing unit (CPU) and a graphical processing unit (GPU).

In some examples, color correction may be performed on a per-pixel basis with a shared 3×3 transform in a graphics processor unit (GPU) compositor shader (e.g., linear gamma) on mobile devices. A personal computer (PC) platform may support more accurate corrections (e.g., 3D color lookup). Such corrections may be too computationally expensive for mobile graphics processor unit (GPU) implementations.

For dynamic color correction (DCC) and dynamic brightness correction (DBC), if the per-pixel 3×3 transform may be described as a combination of two or three basis 3×3 transforms based on eccentricity, the per-pixel 3×3 transform may be handled with little, if any, costs in computing resources. The interpolation function may be computationally cheap to evaluate. For example, linear or low order polynomials are computationally cheap to evaluate, while floating exponential or Gaussian functions may be more computationally expensive. For dynamic color correction (DCC) and dynamic brightness correction (DBC), each zone may have its own arbitrary 3×3 transform function. During runtime, it would be prohibitively computationally expensive to sample and interpolate from hundreds of transforms. In some examples, a dedicated piece of silicon, e.g., a data processing unit (DPU) or a display driver integrated circuit (DDIC) may facilitate sampling and interpolating from the 3×3 transforms.

In some cases, the one or more computing platforms 402 may be communicatively coupled to the remote platform(s) 404. In some cases, the communicative coupling may include communicative coupling through a networked environment 420. The networked environment 420 may include a radio access network, such as LTE or 5G, a local area network (LAN), a wide area network (WAN) such as the Internet, and/or wireless LAN (WLAN), for example. It will be appreciated that these examples are not intended to be limiting, and that the scope of this disclosure includes examples in which one or more computing platforms 402 and remote platform(s) 404 may be operatively linked via some other communication coupling. The one or more computing platforms 402 may be configured to communicate with the networked environment 420 via wireless or wired connections. In addition, in some examples, the one or more computing platforms 402 are configured to communicate directly with each other via wireless or wired connections. Examples of one or more computing platforms 402 may include, but are not limited to, smartphones, wearable devices, tablets, laptop computers, desktop computers, Internet of Things (IoT) devices, and/or other mobile or stationary devices. In some examples, the system 400 may also include one or more hosts or servers, such as the one or more remote platforms 404 connected to the networked environment 420 through wireless or wired connections. In some examples, remote platforms 404 may be implemented in or function as base stations, which may also be referred to as Node Bs or evolved Node Bs (eNBs). In some examples, remote platforms 404 may include web servers, mail servers, application servers, etc. According to some examples, remote platforms 404 may be implemented as standalone servers, networked servers, or an array of servers.

The one or more computing platforms 402 may include one or more processors 426 for processing information and executing instructions or operations. One or more processors 426 may be any type of general or specific purpose processor. In some cases, multiple processors 426 may be utilized. The one or more processors 426 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as non-limiting examples. In some cases, the one or more processors 426 may be remote from the one or more computing platforms 402, such as disposed within a remote platform like the one or more remote platforms 404.

The one or more processors 426 may perform functions associated with the operation of the system 400, which may include, for example, precoding of antenna gain/phase parameters, encoding and decoding of individual bits forming a communication message, formatting of information, and overall control of the one or more computing platforms 402, including processes related to management of communication resources.

The one or more computing platforms 402 may further include or be coupled to the memory 418 (internal or external), which may be coupled to one or more processors 426, for storing information and instructions that may be executed by one or more processors 426. Memory 418 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 418 may include any combination of random access memory (RAM), read only memory (ROM), static storage such as a magnetic or optical disk, hard disk drive (HDD), or any other type of non-transitory machine or computer readable media. The instructions stored in memory 418 may include program instructions or computer program code that, when executed by one or more processors 426, enable the one or more computing platforms 402 to perform tasks as described herein.

In some examples, the one or more processors 426 may include one or more graphics processing units (GPUs). GPUs may include more arithmetic logic units (ALUs) compared with CPUs. GPUs may be suitable for performing billions of repetitive arithmetic operations. For example, GPUs may be suitable to address problems that may be expressed as data-parallel computations, e.g., problems in which the same program is executed on many data elements in parallel, with a high ratio of arithmetic operations to memory operations.

In some examples, a gaze-aware graphics processing unit (GPU) architecture may determine what operations arithmetic logic units (ALUs) are running, conserving bandwidth (e.g., data needed to transfer from memory to the graphics processing unit (GPU)). Operations close to the eye gaze may be more important on a frame-by-frame basis. A graphics processing unit (GPU) may be able to determine a level to which rendering occurs, potentially obviating the need for pixel-level operations if they are farther away from the eye gaze.

In some examples, one or more computing platforms 402 may also include or be coupled to one or more antennas 430 for transmitting and receiving signals and/or data to and from one or more computing platforms 402. The one or more antennas 430 may be configured to communicate via, for example, a plurality of radio interfaces that may be coupled to the one or more antennas 430. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

Figure 9:
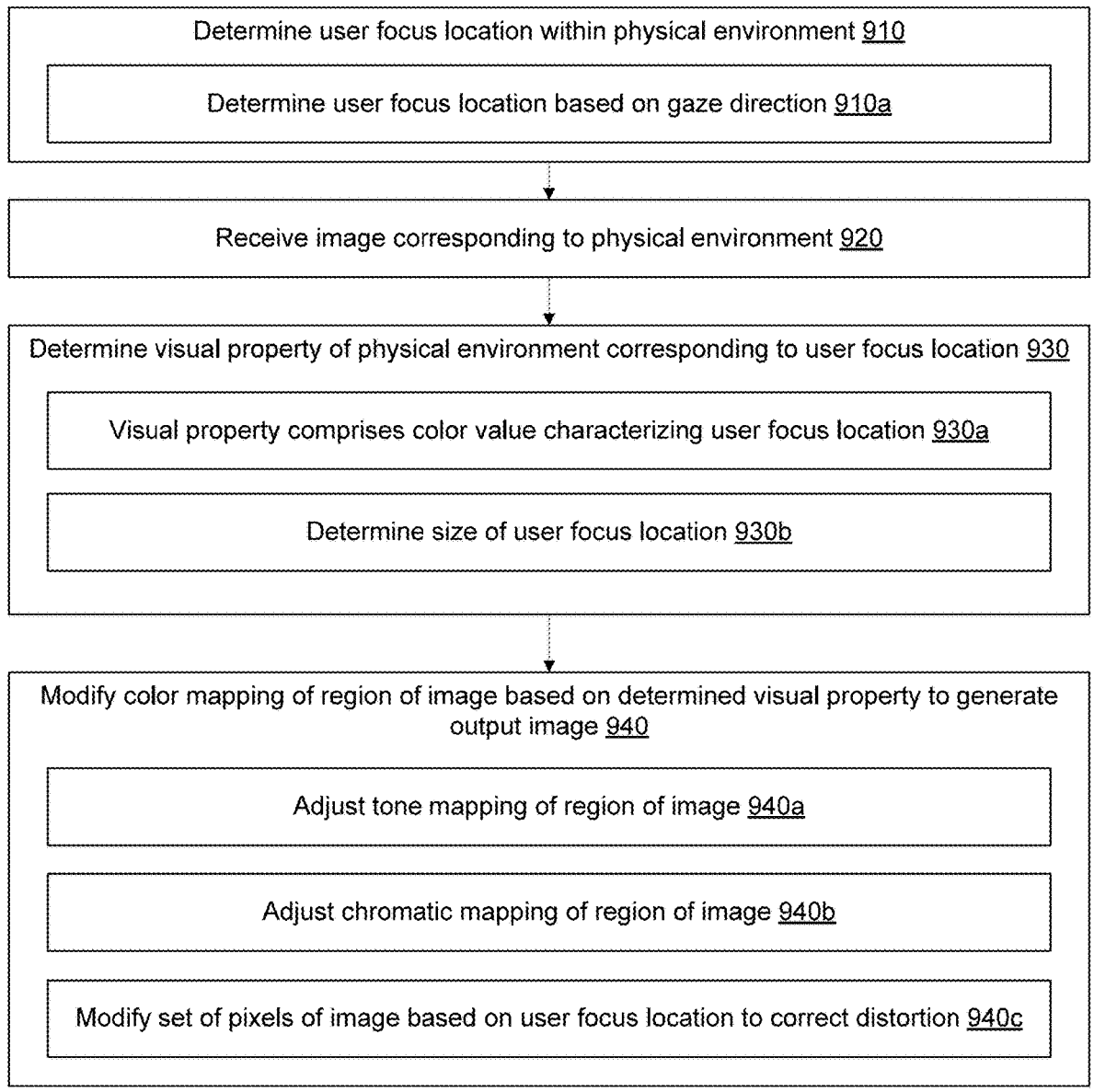
FIG. 9 is a flow diagram illustrating an example method for using gaze-aware tone mapping and chromatic adaptation, according to some examples.

FIG. 9 is a flow diagram illustrating an example method 900 for using gaze-aware tone mapping and chromatic adaptation, according to various examples. In various examples, the method 900 is performed by a device (e.g., the color correction system 400 of FIG. 4). In some examples, the method 900 is performed by processing logic, including hardware, firmware, software, or a combination thereof. The method 900 may be performed by a processor executing code stored in a non-transitory computer-readable medium (e.g., a memory). Briefly, in various examples, the method 900 may include determining a user focus location within a physical environment and receiving an image corresponding to the physical environment. A visual property of the physical environment corresponding to the user focus location may be determined. A color mapping of a region of the image may be modified based on the determined visual property to generate an output image.

As represented by block 910, in various examples, the method 900 may include determining a user focus location within a physical environment. For example, the color correction system 400 may determine a location in the physical environment to which the user's attention is directed. Gaze direction may be used as a proxy for the user's attention. For example, the color correction system 400 may determine that the user's attention is focused on a location at which the user's gaze is directed. As represented by block 910*a*, in some examples, the gaze analysis module 410 may determine the user focus location based on a gaze direction. The gaze analysis module 410 may determine the gaze direction of the user based on image data representing the user's eyes. For example, the gaze analysis module 410 may receive image data from user-facing cameras or image sensors. The image data may represent an image or images that include pixels representing the user's pupils. Based on the position of the user's pupils, the gaze analysis module 410 may determine the direction of the user's gaze. In some examples, the user's eyes may be illuminated, for example, by LASER or near infrared (nIR) illumination sources, such as light emitting diodes (LEDs). The image represented by the image data may include pixels representing reflections from the user's eyes (e.g., glints) that may be used to determine the direction of the user's gaze.

As represented by block 920, in various examples, the method 900 may include receiving an image corresponding to the physical environment. For example, For example, the color analysis module 412 may receive image data representing the physical environment from a world-facing camera or image sensor. Due to optical design and hardware limitations, the user's view of the physical environment may differ from the image. For example, it may be difficult to achieve uniform color across the field of view of a displayed representation of the physical environment. For example, display hardware, such as organic light emitting diodes (OLEDs), may exhibit changes in perceived color when viewed from different viewing angles. Optical layers and/or lenses between the display and the human eye may also contribute to color distortion. As another example, viewing optics in virtual reality (VR) systems (e.g., pancake optics) may exhibit ghosting and veiling glare issues due to complex optical layers and coatings.

As represented by block 930, in various examples, the method 900 may include determining a visual property of the physical environment corresponding to the user focus location. In some examples, as represented by block 930*a*, the visual property may include a color value characterizing the user focus location. For example, the color analysis module 412 may analyze color values associated with one or more pixels in the image data to determine a color value associated with the location in the physical environment to which the user's gaze is directed. In some examples, the visual property may include a brightness value characterizing the user focus location. For example, brightness may be determined based on RGB values of pixels in a selected area.

In some examples, as represented by block 930*b*, the method 900 may include determining a size of the user focus location. For example, the color analysis module 412 may select a size of the area that is to serve as a basis for tone mapping and/or chromatic adaptation. In some examples, the color analysis module 412 may apply an averaging or filtering function to the image data representing the physical environment. For example, the color analysis module 412 may apply a filtering function to account for noise and/or natural micro saccade from the eye tracker. In some examples, the color analysis module 412 may differentiate between different eye movements such as saccade, micro saccade, slow pursuit, and/or vestibulo ocular reflex (VOR). The color analysis module 412 may apply different filtering functions to account for each type of eye movement. For example, the color analysis module 412 may apply little or no averaging to the image data in the case of saccade so that changes may be applied more quickly.

As represented by block 940, in various examples, the method 900 may include modifying a color mapping of a region of the image corresponding to the physical environment based on the determined visual property to generate an output image. For example, the pixel modifier module 414 may use the color values from the area around the user focus location to perform color correction on a region of the image.

In some examples, as represented by block 940*a*, modifying the color mapping may include adjusting a tone mapping of the region of the image. For example, the pixel modifier module 414 may perform dynamic brightness adjustment, as described herein in connection with FIG. 5.

Due to optical design and hardware limitations, it may be difficult to achieve uniform color across the field of view (FOV). Display hardware (e.g., organic light emitting diodes (OLEDs)) may exhibit color changes when viewed from different viewing angles. In some examples, brightness correction may be implemented as part of color correction. Brightness correction may be achieved by emission duty or persistence adjustment and/or backlight spatial adjustment. Brightness correction may be spatially slow, e.g., there may be few or no sharp corrections. In some examples, brightness correction may be performed every across the field of view (FOV) with a smooth transition, such as a B spline surface.

In some examples, as represented in block 940b, modifying the color mapping may include adjusting a chromatic mapping of the region of the image. For example, the pixel modifier module 414 may perform local white balancing (e.g., adjust a white point) based on an area around the user focus location, as described herein in connection with FIG. 6.

In some examples, due to optical design and hardware limitations, it may be difficult to achieve uniform color across the field of view (FOV). Display hardware (e.g., organic light emitting diodes (OLEDs)) may exhibit color changes when viewed from different viewing angles. Color correction may be applied on a per frame basis across the display area, based on the user focus location (e.g., gaze direction). In some examples, the color correction may be spatially slow, e.g., there may be few or no sharp corrections. In some examples, color correction may be performed every 10° across the field of view (FOV) with a smooth transition, such as a B spline surface.

In some examples, the pixel modifier module 414 may use user focus location (e.g., gaze direction) information to perform dynamic color correction (DCC) and dynamic brightness correction (DBC) on an image, as described herein in connection with FIG. 8.

In some examples, as represented in block 940c, the method 900 may include modifying a set of pixels of the image based on the user focus location to correct distortion. Distortion (e.g., pupil swim) may be introduced instability or exacerbated to achieve other benefits, such as higher resolution or more accurate color in the center field of view (FOV). The pixel modifier module 414 may compensate for distortion instability associated with changes in user focus location (e.g., gaze direction) by dynamic distortion correction (DDC). In some examples, dynamic distortion correction (DDC) focuses on peripheral minor adjustments with a large spatial size. A base distortion may be present, e.g., to present a barrel-shaped display pattern to achieve a regular angular space through the lens. Dynamic color correction (DCC), dynamic brightness correction (DBC), and/or dynamic distortion correction (DDC) may be applied on top of this base distortion correction.

Dynamic color correction (DCC), dynamic brightness correction (DBC), and/or dynamic distortion correction (DDC) may be performed by software, by a display driver integrated circuit (DDIC), and/or by a system on a chip (SOC), which may include a central processing unit (CPU) and a graphical processing unit (GPU).

In some examples, color correction may be performed on a per-pixel basis with a shared 3×3 transform in a graphics processor unit (GPU) compositor shader (e.g., linear gamma) on mobile devices. A personal computer (PC) platform may support more accurate corrections (e.g., 3D color lookup). Such corrections may be too computationally expensive for mobile graphics processor unit (GPU) implementations.

For dynamic color correction (DCC) and dynamic brightness correction (DBC), if the per-pixel 3×3 transform may be described as a combination of two or three basis 3×3 transforms based on eccentricity, the per-pixel 3×3 transform may be handled with little, if any, costs in computing resources. The interpolation function may be computationally cheap to evaluate. For example, linear or low order polynomials are computationally cheap to evaluate, while floating exponential or Gaussian functions may be more computationally expensive. For dynamic color correction (DCC) and dynamic brightness correction (DBC), each zone may have its own arbitrary 3×3 transform function. During runtime, it would be prohibitively computationally expensive to sample and interpolate from hundreds of transforms. In some examples, a dedicated piece of silicon, e.g., a data processing unit (DPU) or a display driver integrated circuit (DDIC) may facilitate sampling and interpolating from the 3×3 transforms.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A system, comprising:
 a processor; and
 a memory storing processor-executable instructions that, when executed by the processor, cause the processor to:
  determine a user focus location within a physical environment;
  receive an image corresponding to the physical environment;
  determine a visual property of the physical environment corresponding to the user focus location; and
  modify a color mapping of a region of the image based on the determined visual property to generate an output image, including performing a chromatic adaption of the region of the image to counteract veiling glare and to enable local white balancing based on an area around the user focus location.

2. The system of claim 1, wherein the memory stores further processor-executable instructions for determining the user focus location based on a gaze direction.

3. The system of claim 1, wherein the visual property comprises a color value characterizing the user focus location.

4. The system of claim 1, wherein the memory stores further processor-executable instructions for determining a size of the user focus location.

5. The system of claim 1, wherein the memory stores further processor-executable instructions for modifying a color mapping of a region of the image based on the determined visual property to generate an output image at least in part by adjusting a tone mapping of the region of the image.

6. The system of claim 1, wherein the memory stores further processor-executable instructions for modifying a color mapping of a region of the image based on the determined visual property to generate an output image at least in part by adjusting a chromatic mapping of the region of the image.

7. The system of claim 1, wherein the memory stores further processor-executable instructions for modifying a set of pixels of the image based on the user focus location to correct distortion.

8. A method, comprising:
determining a user focus location within a physical environment;
receiving an image corresponding to the physical environment;
determining a visual property of the physical environment corresponding to the user focus location; and
modifying a color mapping of a region of the image based on the determined visual property to generate an output image, including performing a chromatic adaption of the region of the image to counteract veiling glare and to enable local white balancing based on an area around the user focus location.

9. The method of claim 8, further comprising determining the user focus location based on a gaze direction.

10. The method of claim 8, wherein the visual property comprises a color value characterizing the user focus location.

11. The method of claim 8, further comprising determining a size of the user focus location.

12. The method of claim 8, wherein modifying a color mapping of a region of the image based on the determined visual property to generate an output image comprises adjusting a tone mapping of the region of the image.

13. The method of claim 8, wherein modifying a color mapping of a region of the image based on the determined visual property to generate an output image comprises adjusting a chromatic mapping of the region of the image.

14. The method of claim 8, further comprising modifying a set of pixels of the image based on the user focus location to correct distortion.

15. A nontransitory computer readable storage medium comprising executable instructions that, when executed, instruct a processor to:
determine a user focus location within a physical environment;
receive an image corresponding to the physical environment;
determine a visual property of the physical environment corresponding to the user focus location; and
modify a color mapping of a region of the image based on the determined visual property to generate an output image, including performing a chromatic adaption of the region of the image to counteract veiling glare and to enable local white balancing based on an area around the user focus location and adjusting a chromatic mapping of the region of the image.

16. The nontransitory computer readable storage medium of claim 15, wherein the executable further causes the processor to determine the user focus location based on a gaze direction.

17. The nontransitory computer readable storage medium of claim 15, wherein the visual property comprises a color value characterizing the user focus location.

18. The nontransitory computer readable storage medium of claim 15, wherein the executable further causes the processor to determine a size of the user focus location.

19. The nontransitory computer readable storage medium of claim 15, wherein the executable further causes the processor to modify a color mapping of a region of the image based on the determined visual property to generate an output image at least in part by adjusting a tone mapping of the region of the image.

20. The nontransitory computer readable storage medium of claim 15, wherein the executable further causes the processor to modify a set of pixels of the image based on the user focus location to correct distortion.

* * * * *